Patented Sept. 21, 1926.

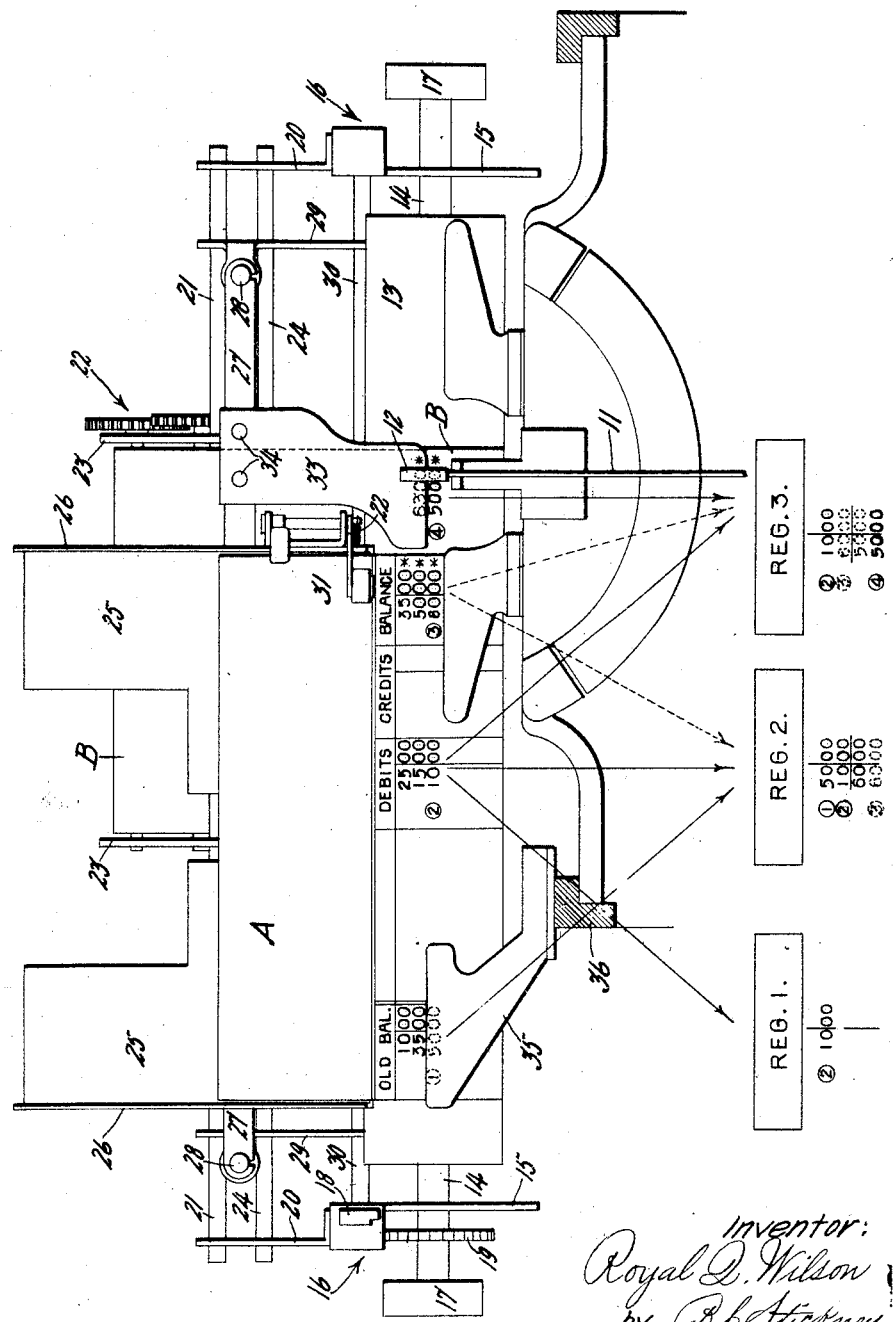

1,600,380

UNITED STATES PATENT OFFICE.

ROYAL Q. WILSON, OF ORANGE, NEW JERSEY, ASSIGNOR TO UNDERWOOD COMPUTING MACHINE COMPANY, OF NEW YORK, N. Y., A CORPORATION OF NEW YORK.

COMBINED TYPEWRITING AND COMPUTING MACHINE.

Application filed October 19, 1923. Serial No. 669,445.

This invention relates to improvements in combined typewriting and computing machines, and to a method of using the same for making and checking ledger entries, and is illustrated as applied to an Underwood bookkeeping machine, one form of which is shown in the patent to Frederick A. Hart, No. 1,270,411, dated June 25, 1918. The machine of the present application is generally similar in purpose and construction to the machines disclosed in the patent to Walter J. Hausman, No. 1,416,023, dated May 16, 1922, and in the application of Harry H. Vickers, Serial No. 661,540, filed September 8, 1923. The invention relates principally to guarding against errors in typing ledger entries, to revealing errors promptly when they do occur, and to mechanically proving the correctness of the entries.

In machines of the particular class referred to, provision was made of a general computation register and of a proving register. Ledger-sheets were inserted one after another for posting, the procedure in each case being to copy the last balance found on the ledger-sheet in an old-balance column and in a proof-column, and, in addition, to type the debit or credit entry and the new balance. The new balance was taken from the general computation register which was arranged to total the old balance entry and the debit or credit entry. The entries written in the old-balance column and in the proof column were run into the proving register with opposite effect, one positively and one negatively, so that they would offset each other and leave the proving register clear at the end of a posting if the old balance had been copied the same in both of said columns. To assure that the proof-column entry would be copied from the balance column and not from the old-balance column, it was proposed in the patent to Hausman, referred to above, to provide a shield which would cover and conceal the old-balance entry while the proof entry was being typed.

There was still the chance, however, that the operator would confuse the balance and proof columns in making the entry in the old-balance column, since the balance and proof columns were arranged side by side. With the purpose of overcoming this objection and of eliminating the need for the old-balance shield provided by Hausman, it was proposed in the application of Vickers, referred to above, to provide a shield for permanently concealing the proving column above the line of writing, to insert the ledger-sheet first to the old line of writing, to first copy the previous balance in the proof column, which, in that case, was upon a separate tally-strip, to line-space the platen and return the carriage, thus moving the item just written in the proof column up out of sight beneath the shield, so that it could not be copied into the old-balance column, and then to make the entries in the old-balance column, the debit or credit column, and finally in the balance-column. General computation and proving registers were provided, and these were so arranged that the general computation register would clear upon the correct writing of the new balance, enabling the printing of a star in the balance column (see patent to Frederick A. Hart, No. 1,190,287, dated July 11, 1916). If the old balance had been copied the same in both the proving and the old-balance columns, the proving register would also be cleared by the writing of the new balance.

While Vickers' invention was a distinct advance in the art, it has been found that where the operator was required, as indicated above, to copy the old balance successively in the proof and old-balance columns without the writing of intervening numbers, there was a possibility that he would remember the number copied in the proof column and write it from memory in the old-balance column, instead of referring again to the balance column, and would thereby cause the proving register to clear at the end of the posting even though a mistake had been made.

An object of the present invention is to compel the operator to copy the balance in both the old-balance column and in the proving column by reference to the balance column, thereby to obviate the errors which might arise through his copying the balance from the wrong column or his writing it from memory. This is accomplished, first, by compelling the copying of the balance in the old-balance column to be separated from the copying of the balance in the proof column by the writing of the other items, and, second, by providing two shields; one to conceal the previously typed entries in the proof column when an entry is being typed in the old-balance column, and the other to conceal the balance as copied in the old-balance column when an entry is being typed in the proof column.

In using the present machine, the balance is first copied in the old-balance column from the balance column, the proof column being concealed by its shield, and this item is concomitantly run into a general computation register. The debit or credit entry is then typed, and this is run into the general computation register and into the proving register. The new balance is then copied in the balance column from the total exhibited by the general computation register, and this subtracts the amount so written out of both the general computation register and the proving register. If the amount exhibited by the general computation register is correctly copied in the balance column, the general computation register is thereby cleared and the operator then prints a star adjacent the balance column to show that the register has been cleared. It is understood, of course, that the register can be operated to print the star only when it is clear. The old balance is then copied again, this time in the proof column, which is on the margin of a separate tally-strip. At the time of writing this item, the operator's mind has been diverted from the amount written in the old-balance column by the subsequent writing of the other items, and the amount written in the old-balance column is concealed by the shield provided for that purpose, so that the operator is compelled to look to the balance column to ascertain the amount to be written. If the amount copied is the same as that copied in the old-balance column, as it should be, the proving register will be cleared by the running in of the item written in the proof column. The operator then prints a star adjacent the proof column to indicate that the proving register has been cleared. This obviates the possibility of the operator's overlooking a failure of the proving register to clear.

It will be observed that in using the present machine in the manner outlined above, the printing of the star in the proof column is important for several reasons. The star can only be printed in case the items are typed in the order specified above, for if they were written in the same order as in the Vickers application the proving register would not be clear when the machine is in the proof column, and hence no star could be printed there. The requirement for the printing of the star in the proof column, therefore, compels the writing of the items in such sequence that the operator cannot write the old balance from memory, and the star therefore indicates that they have been written in such order.

The printing of the star in the proof column shows also that the general computation register was clear when the posting was begun. Let it be assumed, for example, that the machine has been tampered with between postings so that a posting is started with the general computation register standing away from zero. The running into the general computation register of the old balance and the debit or credit item would cause an incorrect new balance to be exhibited by that register. The copying of this new balance from the general computation register in the balance column would clear the register and enable the star to be printed adjacent the balance column in spite of the fact that the amount of the new balance is incorrect. With the registers arranged as they are in the present machine, however, this incorrect amount would also be run into the proving register, and the subsequent writing of the old balance in the proof column would not therefore clear the proving register, so that the star could not be printed adjacent the proof column. This would cause the operator to check up the posting and discover the error at once.

An important feature of the invention relates to the added value of the tally-strip as typed by the method disclosed herein. The tally-strip, which bears the proof column, extends across beneath the debit, credit and balance columns of the ledger-sheets, and receives impressions, through interleaved carbon, of items written in these columns. All of the figures pertaining to each posting appear on a single line of the tally-strip. Therefore, should the accounts fail to balance at the end of a day or other business period, this tally-strip affords a convenient check of the transactions posted and makes it unnecessary to refer back to the individual ledger-sheets in tracing errors, so that the ledger-sheets may be released for filing or other use promptly after they are typed. The star is the balance column indicates conclusively that the total exhibited by the general computation register was correctly copied, and the star in the proof column indicates conclusively that the old balance was copied the same in that column as in the old-balance column. This second star also indicates, as pointed out above, that the items were written in the correct order to prevent writing from memory. Mere reference to the stars on the tally-stip, without examination of the figures themselves, eliminates every possibility of error except the remote one that the old balance at one of the postings has been copied incorrectly and the same in both the old-balance column and the proof column, and this is extremely unlikely due to the provision of the two shields and to the order of typing the entries.

In the event that the proving register does not clear, the operator will wish to examine all of the items written. The items of a posting are all written on a single line in accordance with the present invention, and hence all may be seen simply by moving the carriage longitudinally to bring the old-balance column clear of its shield. This makes it unnecessary to mount the proof-column shield for movement to an ineffective position to permit inspection of the item written in the proof column, because said item remains in view at the writing line until after the posting has been completed. The proof-column shield is accordingly fixed permanently in effective position. This is an important feature of the present invention, since it makes it impossible for the operator, either negligently or willfully, to keep the shield in an ineffective position when using the machine.

In accordance with one feature of the invention, provision is made of an old-balance column shield mounted on a stationary part of the machine in combination with tally-strip mechanism and a front collating table for positioning a tally-strip and a ledger-sheet in predetermined relation to each other and in such relation to the shield that the old-balance column on the ledger-sheet will be concealed behind the shield when the proof column on the tally-strip is in writing position.

Other features and advantages will hereinafter appear.

The accompanying drawing is a sectional front elevation of a portion of an Underwood bookkeeping machine, illustrating one form of the invention, the manner in which the entries are run into the various registers being shown diagrammatically.

Upon depression of type-keys (not shown), type-bars 11 are swung upwardly and rearwardly to cause types 12 to print on a platen 13 journaled by means of an axle 14 in the ends 15 of a platen-frame 16 mounted in a traveling carriage. The usual front and rear feed-rolls (not shown) cooperate with the platen to feed ledger-sheets A inserted around the platen 13 from the rear thereof. The platen 13 may be rotated either by finger-wheels 17 at the opposite ends of the axle 14, or by line-space mechanism comprising a line-space lever (not shown), a line-space slide 18 and a ratchet-wheel 19 fixed on the platen-axle.

Mounted on the ends of the platen-frame 16 are brackets 20, in which is journaled a transverse shaft 21 for driving suitable tally-strip mechanism 22. Such tally-strip mechanism may be substantially the same as that disclosed in the patent to Frederick A. Hart, No. 1,281,160, dated October 8, 1918. The tally-strip mechanism 22 is operated by suitable connections from the line-spacing mechanism to the shaft 21, and this shaft is connected through suitable gearing, as in the Hart patent, to feed the tally-strip B step by step. The tally-strip mechanism 22 comprises end plates 23, which are supported upon the shaft 21 and upon a rod 24 which extends between the brackets 20 on the ends of the platen-frame 16. It will be understood that the tally-strip B is line-fed by the tally-strip mechanism 22 at the same time that the platen 13 is advanced to line-feed the ledger-sheet A in the machine.

For use in connection with a ledger-sheet A, and, if desired, with a statement-sheet (not shown), a collating table 25, having side-edge gages 26, is mounted at the delivery side of the platen by means of a transverse bar 27, having slotted ends to engage with headed studs 28 mounted on brackets 29 supported by a transverse rod 30 connecting the ends of the platen-frame 16 and by the shaft 21 and the rod 24. Provision may also be made of a clamping finger 31 controlled by a double-acting spring 32 which holds the finger 31 either in clamping position against the surface of the table 25 or in ineffective position when moved thereto.

As herein disclosed, the ledger-sheet A is provided with an old-balance column, a debit column, a credit column and a balance column. The tally-strip B passes around the platen 13 beneath the debit, credit and balance columns of the ledger-sheet A to receive carbon impressions of the entries typed therein, and also projects beyond the right edge of the ledger-sheet to provide a proof column. As shown diagrammatically in the drawing, the bookkeeping machine is so set that an entry (1) in the old-balance column is run into a general computation register, herein referred to as register 2; an entry (2) in the debit column is run into an accumulating register 1, into the general computation register 2, and into a proving register 3; an entry (3) in the balance column is subtracted out of registers 2 and 3; and an entry (4) on the exposed portion of the tally-strip is run into register 3. It will be seen that for convenience the entries are so numbered as to indicate the order in which they are typed. Entry (3) is copied from the total exhibited by register 2 after entries (1) and (2) have been run into it. The subtraction of this amount from register 2 clears the register. The register 2 is equipped with star-printing mechanism, which may be operated to print a star adjacent the balance column when register 2 is cleared. The subtraction of the amount of entry (3) from register 3 produces a negative total in register 3, which is equal numerically to the amount of the old balance.

The running of entry (4) into register 3 clears register 3. Register 3 is equipped with star-printing mechanism, which may be operated to print a star adjacent the proof column when register 3 is cleared.

Provision is made of a blinder or shield 33 which is fixedly and immovably mounted, by rivets 34 or other suitable means, upon the bar 27 which supports the front collating table 25. This shield 33 extends down over the proof column on the margin of the tally-strip B, permanently concealing all of said column down to the line of writing. Since there is no entry in the writing line of the proof column at the time when the old-balance entry is typed, the figures in the proof column are completely concealed by the shield, so that there is no possibility of the operator confusing the balance and proof columns when copying the balance in the old-balance column. The fixed mounting of the shield 33 upon the bar 27 is an important feature, since it prevents the operator from keeping the shield in an ineffective position during the use of the machine.

It is important that the balance column, and not the old-balance column, be referred to for the amount to be entered in the proof column. A shield 35 is mounted on an end member 36 of the machine-frame and extends up across the line of writing. This shield is so positioned that it will conceal the last entry in the old-balance column, entry (1), when the entry (3) in the proof column is being written.

In using the machine, the operator first inserts a ledger-sheet A with its old writing line in writing position, and line-spaces the platen 13 to feed the ledger-sheet A and the tally-strip B forward one line-space. The first entry (1) is then made by copying the last item appearing in the balance column into the old-balance column at the new line. The debit or credit entry (2) is then typed, and the new balance (3) is written in the balance column, it being copied from the total exhibited by the general computation register. This clears the general computation register, and the operator prints a star which appears both upon the ledger-sheet and upon the tally-strip adjacent the balance column. The operator then copies the same item from the balance column as entry (4) which he originally copied in the old-balance column as entry (1), and this clears the proving register. The old-balance column is concealed by the shield 35 when the machine is in position for writing in the proof column. The operator prints a star adjacent the proof column upon the completion of the entry in said column, to show that the proving register has been cleared by the running in of the amount of said entry. In case either register 2 or 3 fails to clear, the items written at the posting may be inspected simply by moving the carriage longitudinally to carry the old-balance column clear of its shield 35, since all of the entries of the posting appear along a single line of writing.

The result in the accumulating register 1 at the end of a series of postings may be used for comparison with the summation of the debits and credits obtained independently by another operator. If the results do not agree, reference may be made to the tally-strip to check the debit and credit entries.

It will be noted that a ledger-sheet may be adjusted around the platen from the front; that the free end is first brought into alignment with the collating table to square the sheet to the platen; and that the sheet may then be adjusted up or down to align the upper edge of the typed characters of the old balance to the top edge of the old balance shield 35 to cover the characters of the last old balance entry, and, from which adjusted position, the platen may be line-spaced for the next entry when the new balance is first typed in the old balance column.

Variations may be resorted to within the scope of the invention, and portions of the improvements may be used without others.

Having thus described my invention, I claim:—

1. In a typewriting machine, the combination with a platen, of a carriage, a column screen fixed with relation to the platen and overlying the work-sheet on the platen and extending down to a point just above the printing line and covering previously typed entries in the column, and a second column screen, cooperative with the first, one of said screens moving with said carriage and the other being stationary, said second column screen overlying the printing line and covering a certain entry in one column at the typing of a duplicate entry on the same line below the first column screen, while the proper entry, from which said duplicate entry is being typed, remains exposed on the work-sheet.

2. In a combined typewriting and computing machine, a platen, a carriage therefor, and means for effecting a ledger posting and proving the same, comprising a proof column shield mounted for movement with the platen and arranged to conceal the figures in a proof column of the work while the previous balance is being copied in an old balance column, and an old balance column shield mounted independently of the carriage in a position such that the figures written in the old balance column will be moved behind the old balance column shield and be concealed thereby when the carriage is moved to position for writing in the proof column, the arrangement being such that the operator is compelled to type the entries for said old balance and proof columns from the same source independently.

3. In a combined typewriting and computing machine, a platen, a carriage therefor, and means for effecting a ledger posting and proving the same, comprising a proof column shield to prevent confusion of the numbers above the line of writing in a proof column of the work with the numbers in a balance column thereof when copying an item from the balance column into an old balance column, and an old balance shield to prevent the copying in the proof column of the old balance typed in the old balance column, the construction and arrangement being such that the operator will be compelled to refer to the balance column for the amount to be typed in the proof column.

4. In a combined typewriting and computing machine, a platen, means for typing old balance, debit or credit, balance and proof entries, a shield to conceal the proof column when the old balance entry is being typed, a shield to conceal the old balance column when the proof entry is being typed, and star-printing mechanism operable to print a star adjacent the proof column upon the completion of the entry in the proof column, but only in case the entries have been typed correctly and in the order named.

5. In a combined typewriting and computing machine, a platen, means for typing old balance, debit or credit, balance, and proof entries, a shield to conceal the proof column when the old balance entry is being typed, a shield to conceal the old balance entry when the proof entry is being typed, and means operable to print a symbol upon the completion of the proof entry, the operability of said means being conditioned upon the typing of the entries in the order named and thereby serving to compel the operator to type the entries in that order.

6. In a combined typewriting and computing machine for typing an old balance entry upon a ledger-sheet, debit or credit, and balance entries upon the ledger-sheet and through interleaved carbon upon an underlying work-sheet having a projecting margin for proof entries, in combination, a platen, a shield for concealing the proof entry when the old balance entry is being typed, a second shield for concealing the old balance entry when the proof entry is being typed, a proving register arranged to clear upon the completion of the proof entry, the clearing of the proving register being dependent upon the identity of the amounts of the old balance and proof entries, and star-printing mechanism operable by the proving register to print a star adjacent the proof entry, the operability of the register to print the star being conditioned upon the register being cleared, whereby the printing of the star after the proof entry indicates, after the sheets have been separated, that the amount appearing in the proof column thereof is identical with the amount appearing in the old balance column of the ledger-sheet.

7. In a combined typewriting and computing machine, a platen, means for typing old balance, debit or credit, balance, and proof entries, a shield to conceal the proof column when the old balance entry is being typed, a shield to conceal the old balance entry when the proof entry is being typed, a general computation register to total the old balance and debit or credit entries, a proving register to check the correctness of the entries, and mechanism operable to print a star adjacent the proof column, the operability of said star-printing mechanism being conditioned upon the correct typing of all of the items in the order named, and with the general computation register standing clear at the beginning of the typing operations.

8. In a combined typewriting and computing machine for posting ledger-sheets by typing old balance, debit or credit, balance and proof entries, in combination, a platen, a carriage therefor, a stationary old balance shield mounted independently of the carriage, and collating means at the delivery side of the platen for mechanically locating the inserted ledger-sheet longitudinally of the platen and promoting the alignment of the old balance entry on the ledger-sheet to the edge of the old balance shield for a line-space setting position of the ledger-sheet.

9. In a combined typewriting and computing machine for posting ledger-sheets by typing old balance, debit or credit and balance entries upon the ledger-sheets, and a proof entry upon the projecting margin of a proof-sheet, in combination, a platen, a carriage therefor, a collating table at the delivery side of the platen for locating a ledger-sheet in predetermined relation to the proof-sheet, so that a portion of the proof-sheet will be covered by the ledger-sheet, and a margin of the proof-sheet will project beyond one edge of the ledger-sheet to serve as a proof column to receive the proof entries, and a shield mounted independently of the platen and in predetermined relation to the collating table and the proof-column entry to cover and conceal the entry in the old balance column while the proof column is passing through the printing position.

10. In a combined typewriting and computing machine for posting ledger-sheets by typing old balance, debit or credit, and balance entries upon the ledger-sheet, and proof entries upon a separate work-sheet, in combination, a platen, a carriage therefor, means for mechanically locating said ledger-sheet and separate work-sheet in predetermined relation to each other and to the platen longitudinally thereof, and a shield mounted independently of the carriage and in predetermined relation to the sheet-locating means, so that the old balance column on the ledger-sheet will be concealed by the shield when the proof column on the separate sheet arrives at the printing point of the machine.

ROYAL Q. WILSON.